UNITED STATES PATENT OFFICE.

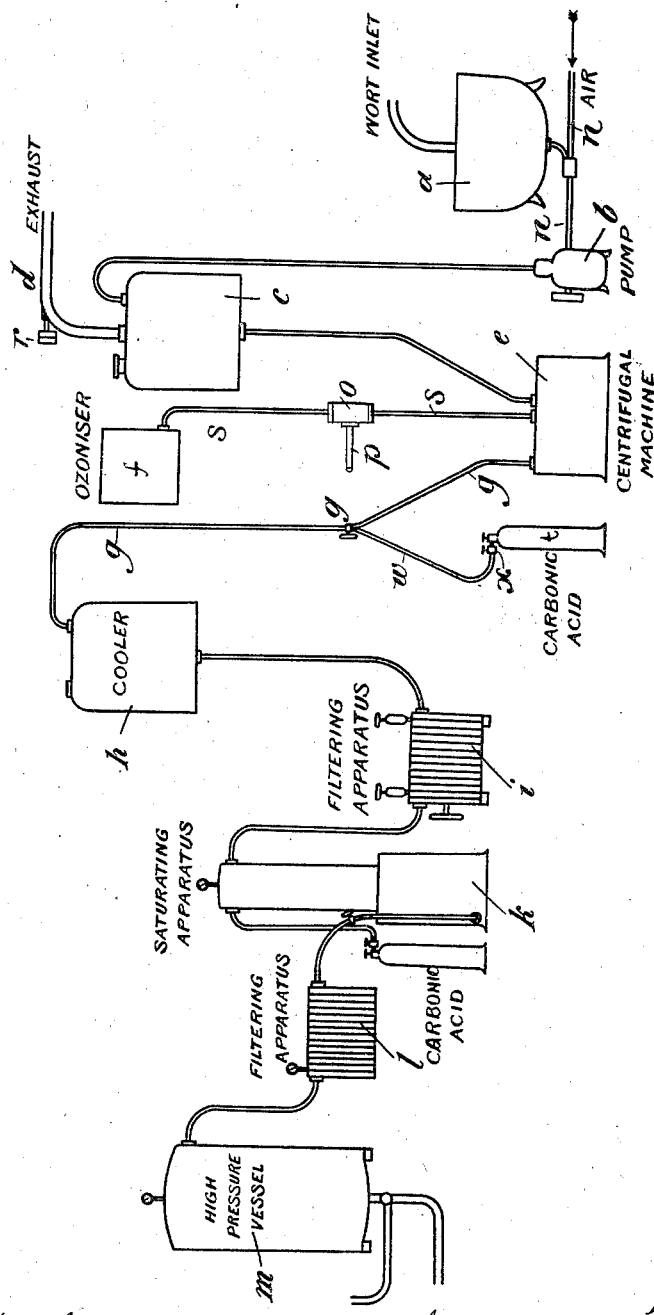

VALENTIN LAPP, OF LINDENAU, GERMANY.

PROCESS OF MANUFACTURING NON-ALCOHOLIC BEER.

SPECIFICATION forming part of Letters Patent No. 709,713, dated September 23, 1902.

Application filed May 22, 1901. Serial No. 61,418. (No specimens.)

*To all whom it may concern:*

Be it known that I, VALENTIN LAPP, brewer, a subject of the King of Saxony, residing at Lindenau, near Leipsic, in the Kingdom of Saxony, in the German Empire, have invented a new and useful Process of Manufacturing Non-Alcoholic Beer, of which the following is a specification.

This invention relates to a process of manufacturing non-alcoholic beer, and in turning this invention into practice I make use of the apparatus shown in the accompanying drawing, the parts of which will be mentioned in the detailed description following.

Wort produced according to any known method is led into the pan $a$ and therein boiled, as usual, whereafter it is pumped to and into a vessel $c$ by means of a pump $b$, the wort being mixed under the way with a rather great quantity of air, preferably two cubic meters per minute, forced directly into the connecting-pipe $n$. The rate at which the wort is being passed through this pipe amounts to one meter per second, it being assumed that the width in the clear of the pipe $n$ amounts to forty-six millimeters. The vessel $c$ is provided with an exhauster $d$ for leading away the liberated vapors and the steam. $r$ indicates the pulley by which the exhauster is actuated. The wort, which has thus been thoroughly aerated by the air, is led from the vessel $c$ into a centrifugal machine $e$ and is therein saturated with ozone generated in an ozonizing apparatus $f$. From the centrifugal machine $e$ the hot wort is passed through a conduit $g$ to a closed cooling vessel $h$. The ozonizer or ozone-generating apparatus $f$ may be of any desired kind and construction; but it is necessary that of the diluted ozone which such an apparatus merely can produce, or, more precisely, of the quantity of diluted ozone which the apparatus can produce in an hour, fifty grams be actual ozone. The percentage of actual ozone in the diluted ozone may be ascertained by any desired of the known methods, and thereafter so much air should be conducted to and into the diluted ozone as originally produced in and by the ozone-generating apparatus that fifty grams of actual ozone are contained in twenty cubic meters of air. This air may at the same time be used for introducing the ozone into and mixing it with the hot wort. For this purpose use may be made of an ordinary jet apparatus, such as indicated at $o$, which is inserted into the pipe $s$, connecting the ozonizer $f$ and the centrifugal machine $e$. The air is forced in through the lateral pipe $p$, and in passing over into the lower part of the pipe $s$ it draws with it the ozone from the upper part of said pipe, all proportions being so determined that the pipe $p$ receives twenty cubic meters of air in one hour, and this air draws with it fifty grams of ozone in the same time. The jet apparatus $o$ may be located, if desired, at the upper or at the lower end of the pipe $s$, either above or within the centrifugal apparatus, and it may be replaced by any other desired contrivance adapted to finely distribute the ozone in the wort. During its way through the conduit $g$ the hot wort is impregnated with $CO_2$, contained in a steel flask $t$. The latter is connected with the conduit $g$ by a pipe $w$, and near to the head of said flask a reduction-valve $x$ is inserted in said pipe. The valve $x$ is so adjusted that the carbonic acid escapes with a pressure of ten atmospheres, and the wort flowing into and contained within the cooler $h$ is thus subjected to that pressure. The wort when entering the vessel or cooler $h$ is cooled at once to below zero, (centigrade scale.) The purpose of this treatment is the following: By quickly and intensely cooling the liquor produced in the aforedescribed manner the disadvantageous albuminous bodies and the like dissolved in the liquor are precipitated, and this precipitation is promoted and accelerated by the high pressure employed. Owing to this process, the beer becomes clearer, keeps good a longer time, and attains a higher quality. After the liquor has been cooled it is made to pass through a filtering apparatus $i$ and then led into a saturating apparatus $k$, in which it is saturated with carbonic acid. Thereafter it is made to pass through another filtering apparatus $l$. The beer, still saturated with carbonic acid, is then led into a vessel $m$ and therein subjected to a pressure of about ten atmospheres and finally it is bottled or racked off, the air contained in the casks having prior thereto been removed. Owing to this means, the bottling or racking-off of the beer proceeds easily and without any excessive generation of froth. The effect of the second pressure of about ten atmospheres consists in a remarkable improvement of the appearance and taste of the beer.

From the commencement of the introduction of the product into the vessel *c* the product is kept out of contact with the outer air through all subsequent phases of the process and in all other parts of the apparatus and is finally led in a perfectly sterile state into containers that are completely avoid of air.

Having now described my invention, what I desire to secure by a patent of the United States is—

The method of manufacturing non-alcoholic beer, consisting in heating wort, ventilating it by means of pure air, saturating it with ozone, adding carbonic acid having a tension of about ten atmospheres, cooling the wort while being under that pressure, filtering it and relieving it at the same time from part of said pressure, saturating it with carbonic acid, filtering it again, and storing the thus-obtained product under a carbonic-acid pressure of ten atmospheres until the bottling or racking-off.

In witness whereof I have hereunto set my hand in presence of two witnesses.

VALENTIN LAPP.

Witnesses:
RUDOLPH FRICKE,
CHAS. J. BURT.